F. H. HOPKINS.
DIAPHRAGM GAGE.
APPLICATION FILED JULY 11, 1917.
1,349,884.
Patented Aug. 17, 1920.
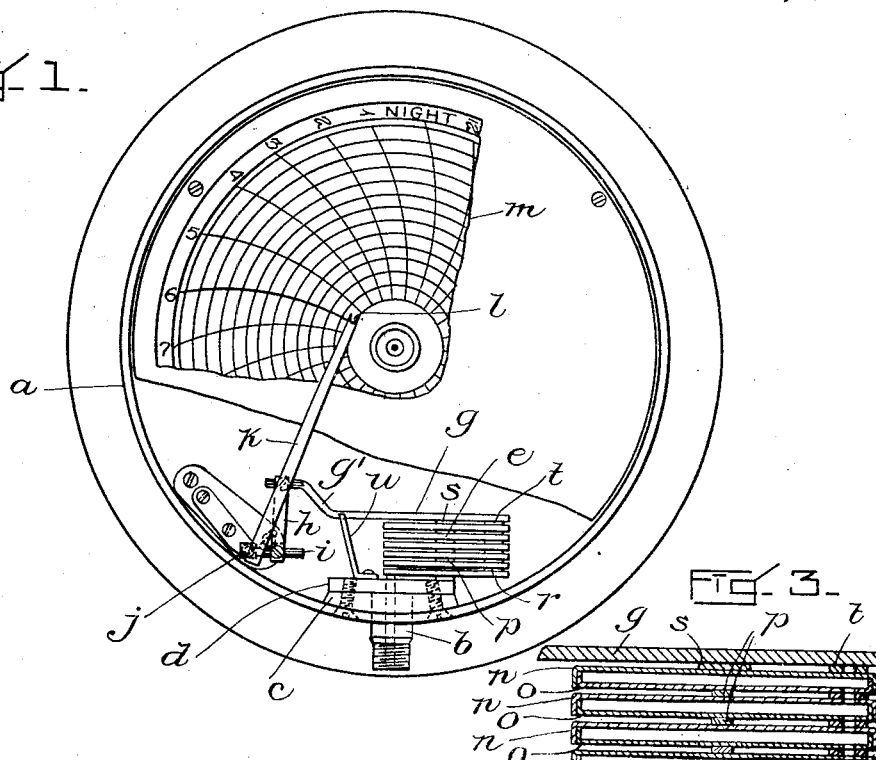
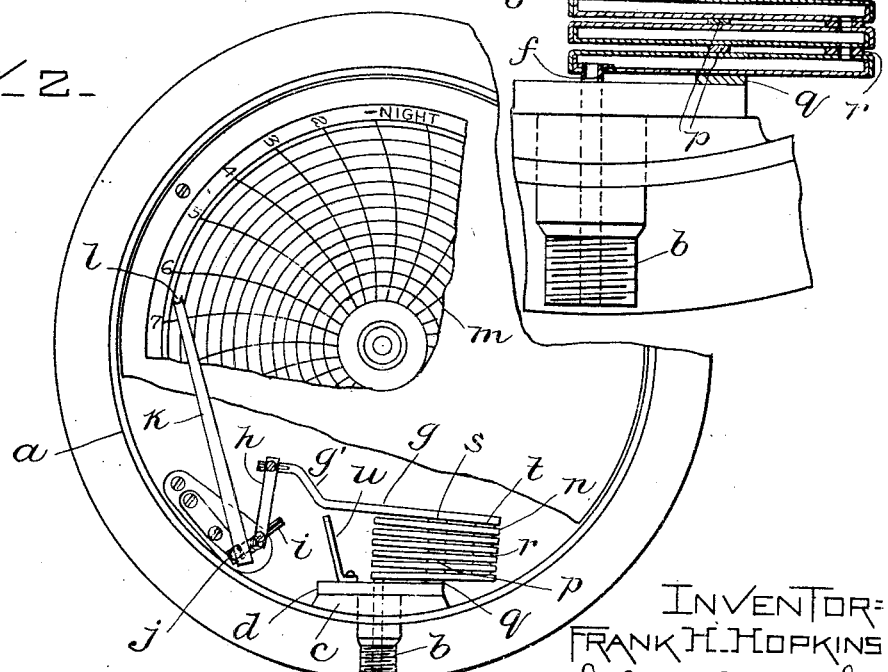
INVENTOR:
FRANK H. HOPKINS
ATTORNEYS

UNITED STATES PATENT OFFICE.

FRANK H. HOPKINS, OF SOMERVILLE, MASSACHUSETTS, ASSIGNOR TO AMERICAN STEAM GAUGE & VALVE MANUFACTURING COMPANY, OF BOSTON, MASSACHUSETTS, A CORPORATION OF MASSACHUSETTS.

DIAPHRAGM-GAGE.

1,349,884. Specification of Letters Patent. Patented Aug. 17, 1920.

Application filed July 11, 1917. Serial No. 179,883.

*To all whom it may concern:*

Be it known that I, FRANK H. HOPKINS, a citizen of the United States, residing at Somerville, in the county of Middlesex and State of Massachusetts, have invented new and useful Improvements in Diaphragm-Gages, of which the following is a specification.

The present invention relates to pressure (and correspondingly vacuum) gages of the type designed to measure low pressures, and being therefore equipped with a plurality of interconnected chambers, the walls of which are composed of flexible diaphragms. The main object of the invention is to provide means for causing a greater amplitude of direct movement in the indicator driving part of such a gage, while at the same time causing such movement to be regular and uniform whereby the position of such driving part corresponds accurately with the fluid pressure acting upon the gage at the time.

I have here shown the invention applied to a pressure gage of the recording type, but without intending thereby to limit the invention in any respect, because the essential principles of the invention may be applied to a vacuum gage and to either a pressure or vacuum gage of the simple indicating type as well as to one of the recording type. In most recording gages the pen or other marker is also an indicator, and such is the case with the gage here shown. In the drawings, Figure 1 is a front elevation with parts broken away of a recording pressure gage embodying the principles of my invention, with the marker or indicator in the zero position.

Fig. 2 is a similar view showing the parts in the extreme pressure indicating position.

Fig. 3 is a detail sectional view of the pressure operated motive element of the gage, the same consisting of a series of diaphragms connected peripherally in pairs so as to form wide shallow chambers, which chambers are physically connected and in communication with one another near their peripheries, and are also connected to one another at their centers.

Referring to the drawings $a$ represents the case of the gage which has the usual nipple $b$ for connection with a pipe containing the fluid of which the pressure is to be measured. On the inside of the lateral wall of the case is a pedestal $c$ on which is mounted a base $d$ carrying the pressure motor $e$ which consists of a series of flat shallow chambers, hereinafter described in detail. The chamber at one end of the series is mounted upon the base $d$ and is connected by a tube $f$ (Fig. 3) with the nipple $b$. Extending across the chamber at the opposite end of the series and connected to it is a bar $g$, a part of which provides an arm $g'$ extending to one side of the motor and connected by a link $h$ with an arm $i$ on a rock shaft $j$ which carries the pen arm $k$ of the instrument. Said pen arm carries a pen $l$ or other marker, and is also the indicator or index of the instrument. Thus the arm $g'$, which is moved by expansions and contractions of the motor causes movement of the indicator arm $k$ and may be fitly described as the indicator driving part of the gage.

The pen or other marker $l$ acts in connection with a dial $m$, which is driven continuously by suitable mechanism, so as to make a record. It also indicates with respect to the circular lines on the dial the momentary pressure acting on the gage. As recording gages and like instruments are well known and widely used and as the dial driving means used in my gage may be the same as those in recording gages of common types, I have not deemed it necessary to illustrate the same herein. It is understood that so far as the indicating and recording feature of the gage is concerned I may use any desired form of indicator or index in coöperation with any appropriate sort of measure; and also may use any effective form of marker in connection with any suitable coöperating record member.

The novel features to which I particularly direct attention and for which I desire protection are contained in the motor itself. The latter is constructed of a series of flexible disks or diaphragms $n\ n\ n\ o\ o\ o$ arranged in alternation in pairs. The diaphragms $n$ and $o$ of each pair preferably have flanges which are joined together and sealed, thereby making of each pair of diaphragms a shallow box or chamber having broad walls which may be corrugated with circular ridges and valleys in the ordinary manner, well known in this art, to increase their flexibility. These boxes are arranged in axial alinement and are connected at their centers to one another, conveniently through interposed pads or disks *p* soldered to the adjacent diaphragms of the neighboring chambers. The outer diaphragms of the endmost chambers are not perforated except as the one next to the base is perforated near its periphery to receive the tube *f* which admits fluid to the motor.

The outer wall of the last-named chamber is secured to the base both by the tube *f* and also at its center through a block or pad *q*. Communication between the adjacent chambers exists near their peripheries through perforated washers *r* interposed between the diaphragms of such chambers, and so placed that their central openings register with holes in the diaphragms, whereby free passage is given from one chamber to the next. These washers are in a line at one side of and approximately parallel to the axial line of the chambers. They not only furnish sealed passages for fluid, but also bond or tie the diaphragms of adjacent chambers to one another at the points where they are applied. The bar *g* is secured to the outer wall of the endmost box through a pad or block *s* at the center in line with the line of disks or pads *p*, and by a pad or washer *t* in line with the washers *r*. All of these washers, pads, etc. are firmly united, by solder or otherwise, with the diaphragms and the other parts lying on opposite sides thereof. The result is that the expansible chambers are connected together so as to prevent separation in a line near the circumference of the motor, diametrically opposite from the driving arm *g'*; and are also connected centrally through disks of such small area (in actual practice they are preferably about one-fourth of an inch in diameter) that the diaphragms are not appreciably stiffened at these points.

The effect of the connection above described is that, as the boxes or diaphragm chambers are expanded by increase of internal pressure their central parts are distended as fully and freely as though they were wholly unconfined and their outer sides are held at an invariable distance apart, while their inner sides are caused to spread apart by approximately double the amount of greatest distention of the chamber. In this connection I would explain that the term outer side as here used means the part of the chamber at the opposite side of the axis from the driving arm, and the term "inner side" the part on the same side of such axis with the driving arm. In consequence the planes of these chambers, as the chambers expand, diverge in proportion to the amount of their expansion or distention, and the angles of divergence between the adjacent chambers are added together to produce a multiplied angle of divergence between the indicator operating arm and the fixed base of the pressure motor. The result of this action is two-fold. First a multiplied movement of the indicator operating arm is secured, and second the movement of this arm is accurately proportional to the pressures acting upon the motor because of the fact that the separate movements of individual chambers are wholly added to one another in their effects upon the operating arm, and there is neither a subtraction of the effect of any one of the chambers from the sum of the effects of the others, as might be the case if the individual chambers were allowed to tilt in any direction toward which they might be inclined by local irregularities or variations in stiffness of the several diaphragms, nor a diminution of this effect such as would be occasioned by stiff connections of relatively large area at the centers of the diaphragms. By making the communication between the chambers at the side, or near the periphery of the motor, and centrally connecting each chamber to the next by a pad or boss of diameter smaller than any connection through which communication may exist could possibly be, there results greater freedom and extent of action of the chambers than would be the case if they were in communication at their centers, on account of the fact that the diaphragms, being thereby made more flexible, are enabled to travel a greater distance at their central points under a given pressure.

The particular means employed by me for attaching the several successive chambers to one another is a feature of the invention which I claim herein. This means, consisting as it does of pads or washers interposed between the chambers in a line parallel with the axis of the chambers, provides a secure bond between the adjacent chambers at an exactly determined point, a bond which is practically incapable of becoming accidentally broken or shifted in position. It further forms a hermetic seal surrounding the communication opening between the adjacent chambers; and furnishes a communication connection which, while having the least width possible for efficiency, is yet wider than the central area of contact of the chambers with one another through the pads *p*.

As the specific embodiment of the invention herein shown is designed for indicating pressures greater than that of the medium by which the gage is surrounded, the arrangement of the mechanism is designed so as to cause an outward swing of the indicator arm from the center of the gage when the operating arm *g'* is moved away from the base *d* of the motor, and a stop *u* is provided to arrest the movement of this arm toward the base when the indicator arm reaches the zero indicating position. It is to be understood, however, that this illustrated arrangement and the described application of the invention are not intended to indicate any limitation, but that all modifications necessary for adapting the invention for use to indicating pressures lower than that of the surrounding medium, or for other uses may be made without departing from the spirit of the invention.

What I claim and desire to secure by Letters Patent is:

1. A diaphragm gage having flexible diaphragms peripherally connected in pairs to form shallow chambers, said chambers being superposed one upon another in a substantially axially alined series, connections having internal open communication between adjacent chambers, all at one and the same side of the axial line of the series, a support for the chamber at one end of the series having an opening for admission of fluid in communication with said end chamber and therethrough with all the chambers, and means connecting the central points of contiguous walls of adjacent chambers together.

2. A diaphragm gage having flexible diaphragms peripherally connected in pairs to form shallow chambers, said chambers being superposed one upon another in a substantially axially alined series, connections having internal open communication between adjacent chambers, all at one and the same side of the axial line of the series, a support for the chamber at one end of the series having an opening for admission of fluid in communication with said end chamber and therethrough with all the chambers, and means connecting the central points of contiguous walls of adjacent chambers together, the contact areas of the last named connecting means with said walls being of less diameter or width than the first-named connections.

3. A fluid operated motor for gages comprising a series of wide shallow chambers or boxes having flexible walls, said chambers being arranged in an alined series in physical connection and internal communication at points near their outer edges, a series of pads interposed between adjacent chambers and secured to the contiguous walls of the same, said pads being all in the axis of the series, a support for the chamber at one end of the series, and an indicator operating member connected to the chamber at the other end of the series.

4. In a diaphragm gage the combination with a series of pressure chambers each constructed of peripherally connected flexible diaphragms, of a communication connection, consisting of a perforated washer, interposed between adjacent chambers and hermetically joined to the contiguous walls of both; said walls having holes in register with the opening in the washer.

In testimony whereof I have affixed my signature.

FRANK H. HOPKINS.